3,388,115
BISULFITE ADDITION COMPOUNDS OF
CARBOHYDRATE PERIODATE OXIDA-
TION PRODUCTS
Harvey E. Alburn, West Chester, and William Dvonch,
Radnor, Pa., assignors to American Home Products
Corporation, New York, N.Y., a corporation of
Delaware
No Drawing. Filed Jan. 8, 1965, Ser. No. 424,178
25 Claims. (Cl. 260—210)

ABSTRACT OF THE DISCLOSURE

Novel bisulfite addition compounds of periodate oxidation products of carbohydrates, such as lactose, maltose, sucrose, adenosine, levoglucosan, substituted pyranosides, uridine, salicin and the like, are provided. The new compounds are water-soluble and are active against tumors in warm-blooded lower animal subjects.

---

This invention is directed to novel bisulfite addition compounds of the periodate-oxidation products of certain carbohydrates and to therapeutically administrable compositions containing such compounds as the active principle thereof.

As determined by standard experimental procedures, the compounds effectively inhibit the growth of specific types of cancer cells. More specifically, the claimed compounds are effective against ascitic forms of tumors and against certain species of leukemia, in particular, lymphoid leukemia.

The specific compounds which are effective for the purposes of the present invention and form the active principle of the new therapeutic compositions are represented by the following formulae; (the "a" formulae denoting the mono-addition compounds having the monoacetal structure); drawn in accord with accepted carbohydrate nomenclature as shown on p. 679 of "Organic Chemistry," F. G. Bordwell, Macmillin & Co. (1963):

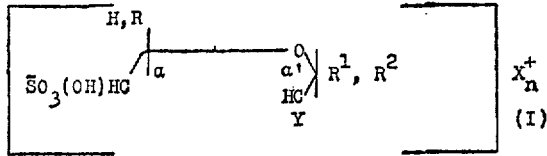

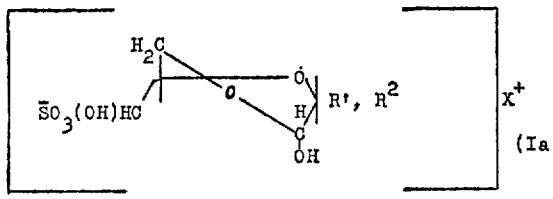

wherein R is selected from the group consisting of hydrogen, hydroxymethyl, aminomethyl, acetamidomethyl, lower alkyl; $R^1$ is selected from the group consisting of hydrogen and hydroxymethyl; $R^2$ is selected from the group consisting of methoxy, ethoxy, phenoxy, hydroxymethylphenoxy, 9-adenyl, diformylmethoxy, ethylthio, 9-guanyl, 6-chloro-9-purinyl, 6-(methylthio)-9-purinyl, allyloxy, 9-xanthinyl, 9-hypoxanthinyl and 1-cytidyl; $n$ is 1 or 2; X is a cation of an alkali metal, Y is $=$O or $\overline{S}O_3(OH)$;

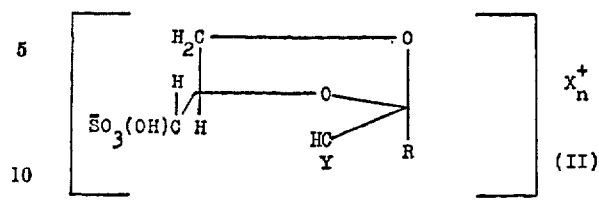

wherein R is selected from the group consisting of hydroxymethyl and hydrogen; Y is $=$O or $\overline{S}O_3(OH)$, $n$ and X are as above;

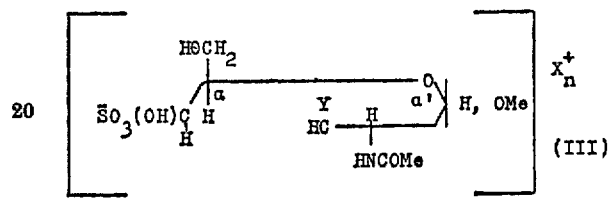

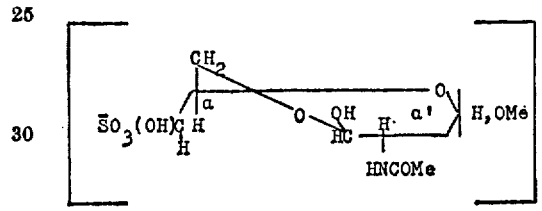

wherein X, $n$, and Y are as above and Me is methyl.

In the foregoing formulae I and III, it will be noted that the valency bonds at the $\alpha$ and $\alpha'$ positions do not always include a substituent. The substituents are shown adjacent to the valence bar to indicate that a particular substitutent may be a either position, thus denoting the isomeric forms in which these structures may exist. In the case of the mono-addition products without hemiacetal formation, while the structure indicated (addition to the distal-carboxaldehyde) is preferred, there is also formed some amount of product where addition is to the proximal-carboxaldehyde function. Accordingly, in those formulae where there is no hemiacetal function the substituent on either carboxaldehyde carbon can be $=$O or $\overline{S}O_3(OH)$.

As previously stated, the compounds of the present invention are the bisulfite addition compounds of the oxidation products of selected carbohydrate structures. Among these carbohydrates are lactose, maltose, sucrose, adenosine, levoglucosan, substituted pyranosides, uridine, salicin and the like.

The carbohydrate periodate oxidation products used as starting materials in the present invention are prepared by adding two to six moles of periodic acid as an aqueous solution to one mole of the selected carbohydrate. The periodate oxidation is normally carried out at a temperature of from 5° C. to about 35° C., in the absence of light for a period of from 10 minutes to 50 hours. The oxidation reaction normally proceeds smoothly with no difficulty encountered. However, some difficulty is faced in recovering the desired oxidation product in usable form. Two methods are available to accomplish the necessary separation and purification of the desired product. According to the first method of separation, the solution remaining after the oxidation step is passed over a Dowex-1-acetate column and the column washed with water. The iodate-periodate-free solution and the wash are then freeze-dried. The oxidation product is then obtained in substantially quantitative yields. The alternate method of recovering compounds suitable for the purposes of the present invention is to neutralize the oxidation reaction mixture with strontium hydroxide to a pH of about 8.0. The mixture is then filtered and the filtrate concentrated to dryness. The residue is extracted with an alcohol, filtered free of strontium salts and concentrated in vacuo to a syrup, the desired product. For additional details concerning the preparation of the said starting materials reference is made to co-pending application Ser. No. 276,990, filed Apr. 30, 1963, now abandoned.

The reaction whereby the claimed products of this invention are obtained can be represented by the following equation using as a specific illustrative example thereof the treatment of the periodate-oxidation product of methyl-D-glucoside, α-D-hydroxymethyl-α′-D-methoxydiglycolaldehyde (A), with sodium bisulfite:

selected. It has been found that cell growth of the type previously referred to can be effectively inhibited if from 1 to 100 mg./kg. and preferably from 20.5 to 67.5 mg./kg. of the selected product is used daily. The inhibiting effect of the claimed compounds has been evidenced by decrease in the amount of the tumor cells or by an increase in the survival time of the tested warm-blooded lower animal subjects. This determination is based on the test procedures and standards established in Issue No. I (January 1959) of the Cancer Chemotherapy Reports issued by CCNSC (U.S. Dept. H. E. & W.). As has been suggested, the compositions when so administered are effective in inhibiting the growth of Ehrlich carcinoma ascitic type of tumors and are also effective against lymphoid leukemia of the L1210 type.

The reason for the inhibiting effect on the growth of the particular cancer cells specified by the new compositions of the present invention is not clearly understood. It has been theorized that the particular compounds used herein in some manner inhibit the carbohydrate metabolism thus minimizing or limiting further growth.

Reference now to the examples which follow will provide a better understanding of the manner in which the claimed products are prepared and the manner in which

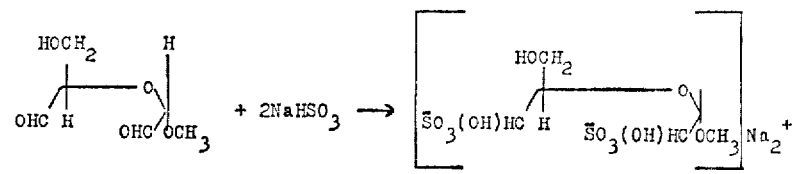

(A)

As the periodate-oxidation products can exist as monoaldehydes through hemiacetal formation:

they are incorporated in the therapeutic composition of the present invention.

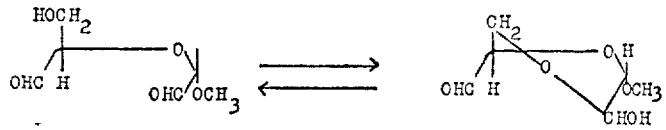

the corresponding bisulfite addition compounds are prepared by using one-half of the amount of the bisulfite to give those compounds of the general formulae above where $n$ is 1 and Y is oxygen; to wit,

EXAMPLE 1

Sodium bisulfite (12.9 g. 0.124 mole) was added to a solution of the periodate-oxidation product of methyl α-D-glucoside (10.1 g., 0.062 mole) in 50 ml. water. The

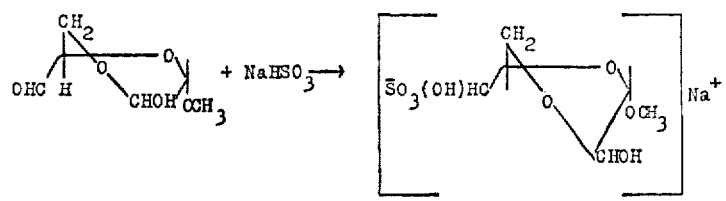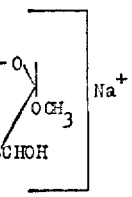

To prepare the claimed compounds, the starting compound (A) is dissolved in water with one or two moles of an alkali metal bisulfite, preferably sodium bisulfite or potassium metabisulfite. The resulting solution is then freeze-dried and the desired addition product is obtained in substantially quantitative yield.

The products obtainable according to the foregoing method of preparation are all water soluble. When a composition of the present invention is to be prepared in aqueous form, a suitable product of the above structures is added to water in an amount of from 0.01–50 mg./cc. and preferably from 0.05 to 10 mg./cc.

The compounds of the type defined and encompassed within the scope of the present invention may be administered in dosage amounts of from 1 to 100 mg./kg. and preferably from 10 to 20 mg./kg. of body weight. The composition may be administered by intravenous, intra muscular, intraparenteral or subcutaneous methods as desired depending on the particular species being treated and adaptability of the species to the mode solution was freeze-dried to yield the sodium bisulfite addition compound.

EXAMPLE 2

Potassium metabisulfite (2.22 g., 0.01 mole) was added to a solution of α-D-(hydroxymethyl)-α′-L-(9-adenyl)-diglycolaldehyde (2.88 g., 0.01 mole) in 100 ml. water to obtain the potassium bisulfite addition compound upon freeze-drying.

EXAMPLE 3

Sodium bisulfiate (6.45 g., 0.062 mole) was added to a solution of the periodate-oxidation product of methyl α-D-glucoside (10.1 g., 0.062 mole) in 50 ml. of water. The resulting solution was freeze-dried to yield the monosodium bisulfiate addition salt.

EXAMPLE 4

Potassium metabisulfite (1.11 g., 0.005 mole) was added to a solution of α - D - (hydroxymethyl)-α′-L-(9-adenyl)-diglycolaldehyde (2.88 g., 0.01 mole) in 100 ml.

of water to obtain the mono-potassium bisulfite addition product upon freeze-drying of the solution.

EXAMPLE 5

Following the procedures of Examples 1–4, the sodium and potassium bisulfite addition compounds of α-D-hydroxymethyl - α' - D - [1-D-formyl-2-D-hydroxymethyl-2 - D([1' - D - formyl - 2' - hydroxy]ethoxy)ethoxy]diglycolaldehyde are obtained. Compositions of the foregoing are prepared by adding the respective compounds to water in the amount of from 0.01 to 50 mg./cc. of water.

EXAMPLE 6

Following the procedures of Examples 1–4, the sodium and potassium bisulfite addition compounds of α-D-hydroxymehtyl - α' - L - (1-uracyl)diglycolaldehyde are obtained.

EXAMPLE 7

Following the procedures of Examples 1–4, the sodium and potassium bisulfite addition compounds of α-L-methyl - α'-L-methoxydiglycolaldehyde, are prepared. To prepare a therapeutic composition thereof the respective products are added to a therapeutically administrable vehicle in the amount of from 0.01 to 50 mg. /cc. of the vehicle.

EXAMPLE 8

Following the procedures of Examples 1–4, the sodium and potassium bisulfite addition compounds of α'-L-methoxydiglycolaldehyde are prepared.

EXAMPLE 9

Following the procedures of Examples 1–4, the sodium and potassium bisulfite addition products of α-D-hydroxymethyl-α'-L-phenoxydiglycolaldehyde are obtained.

EXAMPLE 10

Following the procedures of Example 1–4, the sodium and potassium bisulfite addition compounds of α-D-hydroxymethyl - α' - D,L - ethoxydiglycolaldehyde, are obtained.

EXAMPLE 11

Following the procedures of Examples 1–4, the sodium and potassium bisulfite addition compounds of 2-D-hydroxymethyl - 1,3 - dioxolane-2-D-4-D-dicarboxaldehyde are obtained.

EXAMPLE 12

Following the procedures of Examples 1–4, the sodium and potassium bisulfite addition compounds of α-D-hydroxymethyl - α' - L-[o-(hydroxymethyl)-phenoxy]diglycolaldehyde are prepared.

EXAMPLE 13

Following the procedures of Examples 1–4, the sodium and potassium bisulfite addition compounds of α-D-hydroxymethyl-α'-L-ethylthiodiglycolaldehyde are prepared.

EXAMPLE 14

Following the procedures of Examples 1–4, the sodium and potassium bisulfite addition compounds of α-D-hydroxymethyl-α'-L-(9-guanyl) diglycolaldehyde are prepared. A composition of the present invention is prepared by adding from 0.05 to 10 mg. of any of these compounds to 1 cc. of a therapeutically administrable vehicle.

EXAMPLE 15

Following the procedures of Example 1–4, the sodium and potassium bisulfite addition compounds of α-D-acetamidomethyl-α'-D-methoxydiglycolaldehyde are prepared.

EXAMPLE 16

Following the procedures of Examples 1–4, the sodium and potassium bisulfite addition compounds of α-D-aminomethyl-α'-D-methoxydiglycolaldehyde are obtained.

EXAMPLE 17

Following the procedures of Examples 1–4, the sodium and potassium bisulfite addition compounds of α-D-hydroxymethyl-α'-D-methoxydiglycolaldehyde are prepared.

EXAMPLE 18

Following the procedures of Examples 1–4, the sodium and potassium bisulfite addition compounds of α-D-hydroxymethyl - α' - L-(6-chloro-9-purinyl)diglycolaldehyde are prepared.

EXAMPLE 19

Following the procedures of Examples 1–4, the sodium and potassium bisulfite addition compounds of α-D-hydroxymethyl-α'-L-[6-(methylthio)-9-purinyl]diglycolaldehyde are obtained.

EXAMPLE 20

Following the procedures of Examples 1–4, the sodium and potassium bisulfite addition compounds of α-D-hydroxymethyl-α'-L-allyloxydiglycolaldehyde are obtained.

EXAMPLE 21

Following the procedures of Examples 1–4, the sodium and potassium bisulfite addition compounds of α-D-hydroxymethyl - α' - (9-adenyl)-α'-(hydroxymethyl)diglycolaldehyde are obtained.

EXAMPLE 22

Following the procedures of Examples 1–4, the sodium and potassium bisulfite addition compounds of α-D-hydroxymethyl - α' - [L - formyl-L-(1-D-formyl-2-hydroxyethoxy)methylureido]diglycolaldehyde are obtained.

EXAMPLE 23

Following the procedures of Examples 1–4, the sodium and potassium bisulfite addition compounds of N-[1-D-formyl-2-L-(1'-D-formyl - 2' - hydroxyethoxy) - 2-D-methoxyethyl]acetamide are prepared.

EXAMPLE 24

In the manner of the foregoing examples, the sodium and potassium bisulfite addition compounds of N-[1-D-formyl-2-D-(1'-D - formyl - 2' - hydroxyethoxy)-2-D-methoxyethyl]acetamide are prepared.

EXAMPLE 25

According to the method of the previous examples, the sodium and potassium bisulfite addition compounds of α-D - (hydroxymethyl) - α' - L - (9-xanthyl)diglycolaldehyde are prepared.

EXAMPLE 26

According to the method of the previous examples, the sodium and potassium bisulfite addition compounds of α-D-(hydroxymethyl) - α'-L-(9-hypoxanthyl)diglycolaldehyde are prepared.

EXAMPLE 27

In the manner of the pregoing examples, the sodium and potassium bisulfite addition compounds of α-D-(hydroxymethyl)-α' - L - (1 - cytosyl)diglycolaldehyde are obtained.

It is to be understood that the invention is not to be limited to the exact details of operation or exact compounds shown and described, as obvious modifications and equivalents will be apparent to one skilled in the art. The invention is therefore to be limited only by the scope of the appended claims.

What is claimed is:

1. A compound selected from the group of compounds represented by the formulae:

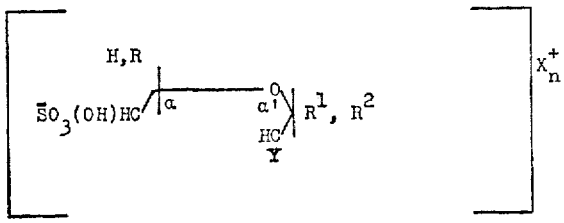

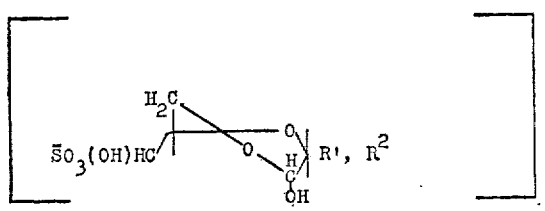

wherein: R is selected from the group consisting of hydrogen, hydroxymethyl, aminomethyl, acetamidomethyl, lower alkyl; $R^1$ is selected from the group of consisting of hydrogen and hydroxymethyl; $R^2$ is selected from the group consisting of methoxy, ethoxy, phenoxy, hydroxymethylphenoxy, 9-adenyl, diformylmethoxy, ethylthio, 9-guanyl, 6-chloro-9-purinyl, 6-(methylthio)-9-purinyl, allyloxy, 9-xanthinyl, 9-hypoxanthinyl and 1-cytidyl; $n$ ranges from 1 to 2; X is selected from the group of sodium and potassium; Y is selected from the group of

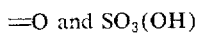

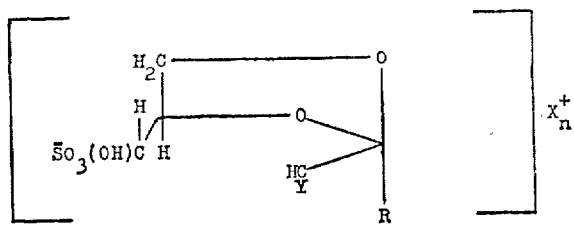

wherein R is selected from the group consisting of hydroxymethyl and hydrogen; $n$, X and Y are as above;

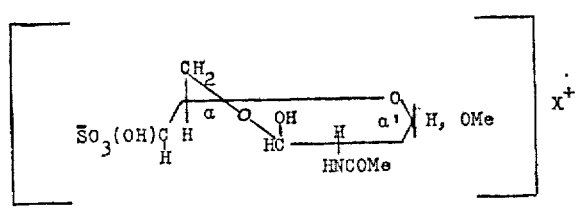

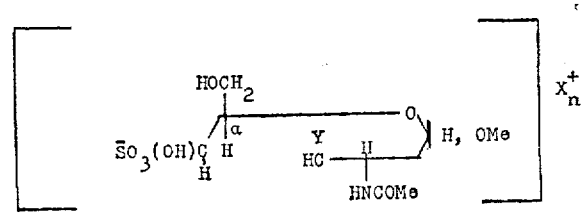

wherein X, $n$, Y are as above and Me represents methyl.

2. A compound selected from the group consisting of the sodium and potassium bisulfite addition products of the periodate-oxidation product of methyl-α-D-glucoside.

3. A compound selected from the group consisting of the sodium and potassium bisulfite addition compounds of α-D-(hydroxymethyl)-α′-L-(9-adenyl)-diglycolaldehyde.

4. A compound selected from the group consisting of the sodium and potassium bisulfite addition compounds of α-D-hydroxymethyl-α′-D-[1-D-formyl-2-D-hydroxymethyl-2-D-([1′-D-formyl-2′-hydroxy]ethoxy)ethoxy] diglycolaldehyde.

5. A compound selected from the group consisting of the sodium and potassium bisulfite addition compounds of 2-D-hydroxymethyl-α′-L-(1-uracyl)diglycolaldehyde.

6. A compound selected from the group consisting of the sodium and potassium bisulfite addition compounds of α-L-methyl-α′-L-methoxy diglycolaldehyde.

7. A compound selected from the group consisting of the sodium and potassium bisulfite addition compounds of α′-L-methoxyglycolaldehyde.

8. A compound selected from the group consisting of the sodium and potassium bisulfite addition compounds of α-D-hydroxymethyl-α′-L-phenoxydiglycolaldehyde.

9. A compound selected from the group consisting of the sodium and potassium bisulfite addition compounds of α-D-hydroxymethyl-α′-D,L-ethoxydiglycolaldehyde.

10. A compound selected from the group consisting of the sodium and potassium bisulfite addition compounds of 2-D-hydroxymethyl-1,3-dioxolane-2-D-4-D-dicarboxaldehyde.

11. A compound selected from the group consisting of the sodium and potassium bisulfite addition compounds of α-D-hydroxymethyl-α′-L-[o-(hydroxymethyl)-phenoxy] diglycolaldehyde.

12. A compound selected from the group consisting of the sodium and potassium bisulfite addition compounds of α-D-hydroxymethyl-α′-L-ethylthiodiglycolaldehyde.

13. A compound selected from the group consisting of the sodium and potassium bisulfite addition compounds of α-D-hydroxymethyl-α′-L-(9-guanyl)diglycolaldehyde.

14. A compound selected from the group consisting of the sodium and potassium bisulfite addition compounds of α-D-acetamidomethyl-α′-D-methoxydiglycolaldehyde.

15. A compound selected from the group consisting of the sodium and potassium bisulfite addition compounds of α-D-aminomethyl-α′-methoxydiglycolaldehyde.

16. A compound selected from the group consisting of the sodium and potassium bisulfite addition compounds of α-D-hydroxymethyl-α′-L-(6-chloro-9-purinyl)diglycolaldehyde.

17. A compound selected from the group consisting of the sodium and potassium bisulfite addition compounds of α-D-hydroxymethyl-α′-L-[6-(methylthio)-9-purinyl]diglycolaldehyde.

18. A compound selected from the group consisting of the sodium and potassium bisulfite addition compounds of α-D-hydroxymethyl-α′-L-allyloxydiglycolaldehyde.

19. A compound selected from the group consisting of the sodium and potassium bisulfite addition compounds of α-D-hydroxymethyl-α′-(9-adenyl)-α′-(hydroxymethyl) diglycolaldehyde.

20. A compound selected from the group consisting of the sodium and potassium bisulfite addition compounds of α-D-hydroxymethyl-α′-[L-formyl-L-(1-D-formyl-2-hydroxyethoxy)methylureido]diglycolaldehyde.

21. A compound selected from the group consisting of the sodium and potassium bisulfite addition compounds of N-[1-D-formyl-2-L-(1′-D-formyl-2′-hydroxyethoxy)-2-D-methoxyethyl]acetamide.

22. A compound selected from the group consisting of the sodium and potassium bisulfite addition compounds of N-[-D-formyl-2-D-(1′-D-formyl-2′-hydroxyethoxy)-2-D-methoxyethyl]acetamide.

23. A compound selected from the group consisting of the sodium and potassium bisulfite addition compounds of α-D-(hydroxymethyl)-α'-L-(9-xanthyl)diglycolaldehyde.

24. A compound selected from the group consisting of the sodium and potassium bisulfite addition compounds of 2-D-(hydroxymethyl)-α'-L-(9-hypoxanthyl)diglycolaldehyde.

25. A compound selected from the group consisting of the sodium and potassium bisulfite addition compounds of α-D-(hydroxymethyl)-α'-2-(1-cytosyl)diglycolaldehyde.

References Cited

Foster et al., "Jour. Chem. Soc.," October 1954, pp. 3367–3371.

Kawashiro: "Chem. Abst." 1956, vol. 50, p. 825(d).

Baer: "Chem. Abst." 1962, vol. 56, p. 15594(e).

Stanek et al.: "The Monosaccharides," 1963, Academic Press, New York, N.Y., pp. 912 and 913.

LEWIS GOTTS, *Primary Examiner.*

J. R. BROWN, *Assistant Examiner.*

UNITED STATES PATENT OFFICE
CERTIFICATE OF CORRECTION

Patent No. 3,388,115            June 11, 1968

Harvey E. Alburn et al.

It is certified that error appears in the above identified patent and that said Letters Patent are hereby corrected as shown below:

Column 7, line 29, cancel "of"; line 37, "$SO_3(OH)$" should read -- $SO_3(OH)$ --. Column 6, line 47, after "α/-" insert -- D- --; line 74, after the opening bracket insert -- 1 --.

Signed and sealed this 13th day of January 1970.

(SEAL)
Attest:

Edward M. Fletcher, Jr.
Attesting Officer

WILLIAM E. SCHUYLER, JR.
Commissioner of Patents